Oct. 13, 1942.  F. E. DAHLSTRÖM  2,298,682
ARRANGEMENT FOR PAINTING
Filed Nov. 8, 1940

Inventor
Fride E. Dahlstrom
by
Atty.

Patented Oct. 13, 1942

2,298,682

UNITED STATES PATENT OFFICE 2,298,682

ARRANGEMENT FOR PAINTING

Fride Edvin Dahlström, Grass, Finland, assignor to Lennart Wilklund, Helsingfors, Finland Application November 8, 1940, Serial No. 364,924

5 Claims. (Cl. 91—62.5)

The invention is directed to an improvement for painting large surfaces to displace the usual brush when painting walls, roofs, doors, vehicles, etc. It is suitable as well for enamel and oil-colours as for water-colours and, moreover, it can be employed for washing out old glue-water colours and removing old wall papers.

According to the invention the implement is in the form of a trundle, mounted for rotation on an axle and covered with soft and solid material, e. g., plush. The trundle is shaped so that an inclined form of the covering is achieved, the middle of the trundle having a greater diameter than the ends. The diameter of the ends differ one from the other.

Contrary to the trundles of uniform diameter or equally reduced toward both their ends, it is important that the ends of the trundle, which narrow relative to the center, and towards which end the colour tends to collect while painting differ in diameter so that one is smaller than the other to present the advantage where:

1. Joint-edges are avoided,
2. The trundle can much more easily be directed in desired direction,
3. Uneven surfaces are better painted, since the trundle narrows down toward its ends, and
4. It is easier to remove and replace the cover.

A special, rectangular painter's pail, the breadth of which has to be larger than the trundle's length, is to be used for dipping the trundle into the colour. This pail is chiefly made of plates and when in use is arranged so that the bottom of the bin is inclined.

Figure 1:
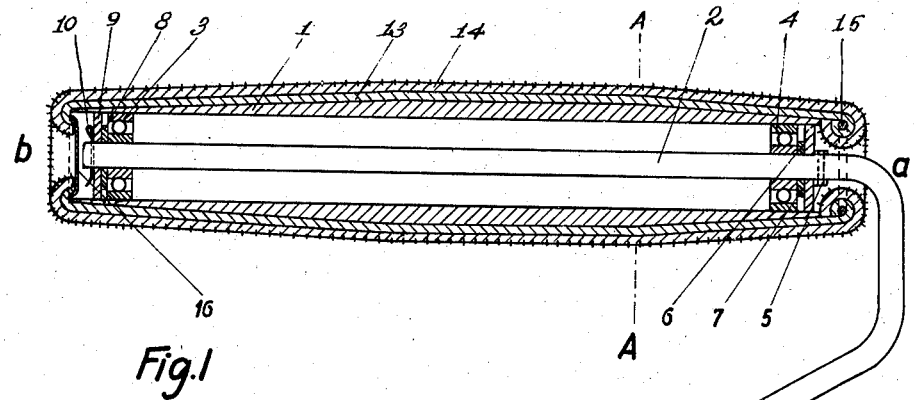
Figure 2:
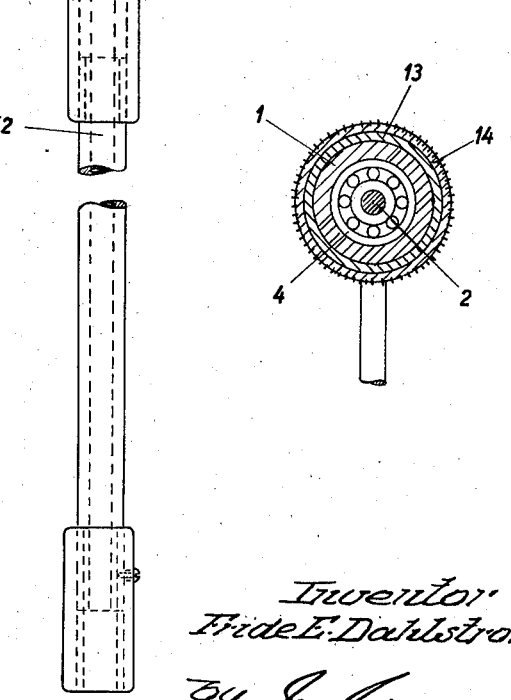

In describing the details of the invention reference is made to the attached drawing, on which the same reference numbers point to the same or corresponding parts of the various figures which represent:

Fig. 1 is a longitudinal section of the trundle arrangement, Fig. 2 a cross section of the trundle.

In the drawing number 1 represents alternatively a trundle or tube, which is mounted on two bearings 3 and 4, preferably ball-bearings, at either end of the trundle, and support an axle 2. These ball-bearings enable the trundle to rotate at the slightest touch on the surface to be painted. The bearings can be arranged inside the tube in any usual way, e. g., crumpling. On the outside of bearings 4 a stuffing ring 5 is arranged, which, by a dog-bolt, is fixed on axle 2 and between which and the bearing a felt-washer 6 is put between two metal sheaves. A metal sheave 7 is placed between washer 6 and bearing 4. There is also a metal sheave 8 at bearing 3, a felt-washer 9 between metal sheaves and a split-pin 10 outside the outer one of these sheaves, which prevents the parts from being displaced. The felt-washers 6 and 9 protect the bearings, prevent the colour from entering them when dipping the trundle, and make it possible to keep it in the water without letting the water get inside the trundle.

The trundle is arranged so that the one end of axle 2 does not slip out of the trundle, but holds the ball-bearing 3 inside the tube at a small distance from its end. This arrangement enables the trundle to reach more easily narrow spots when painting recesses, corners or surfaces, e. g., behind radiators. Outside trundle 1 the axle is formed as shown. A connecting sleeve 11 is attached to the handle, threaded to receive a shank 12, which can be made of one or several threadedly connected parts to lengthen the shank according to requirement.

The trundle or tube 1 has the largest diameter in or chiefly at the longitudinal center. Toward each end it narrows somewhat, and in a still greater degree towards end b. The difference of diameters need not necessarily exceed 2–6 mm. A felt covering 13 is pulled over the trundle and a second cover 14 of plush or a plush-like tissue supplied over the felt. This cover 14 is sewn together on both sides and is fixed to the felt cover. Both covers together form the so-called "stocking." Either cover or, at any rate, the outer one 14 exceeds the trundle's length so much that the ends of the covers can lap the ends of the trundle. Where the axle enters end a of the trundle the "stocking" is drawn together, e. g., by means of a wire-ribbon 15 sewn in between the covers, which retains the "stocking" on the trundle. The other end of the "stocking" can be formed in a similar way but is preferably closed so that a round piece of felt, leather or some other material 16 is sewn in, approximately matching the inner diameter of the tube. Elastics of rubber can, of course, also be used at the ends of the "stocking." Since end a of the trundle, where the shank joins the axle, is pressed more strongly against the base than the "free" end b, the colour on trundles of uniform diameter is pressed towards the ends and an uneven surface with joint-edges results. Since the improved trundle continually narrows toward the ends, chiefly from the middle towards end b, in a slightly greater degree than toward end a, it results that the colour is equally distributed on the painted surface, even though there is a difference of pressure in the various parts of the trundle against the base.

Instead of narrowing down the trundle itself towards both its ends, the same effect can be achieved by shaping the cover itself within its own thickness so that its inside surface can be fitted to a cylindrical trundle.

Having thus described my invention I declare that what I claim is:

1. A trundle for applying paint and the like including an elongated tubular element, a flexible covering therefor, the diameter of the trundle as a whole being greatest at its axial central portion and tapering toward the ends, and a handle on which the tubular element is rotatably supported.

2. A trundle for applying paint and the like, including an elongated tubular element, a flexible covering therefor, the diameter of the trundle as a whole being greatest at its axial central portion and tapering toward the ends, the taper toward one end being in excess of the taper toward the other end, and a handle on which the tubular element is rotatably supported.

3. A trundle for applying paint and the like, including an elongated tubular element, a flexible covering therefor, the diameter of the trundle as a whole being greatest at its axial central portion and tapering toward the ends, the taper toward one end being in excess of the taper toward the other end, and a handle on which the tubular element is rotatably supported, the handle extending lengthwise within and rotatably supporting the element, the handle extending beyond the element end of greatest diameter.

4. A construction as defined in claim 1, wherein the described taper is formed in the peripheral surface of the element.

5. A construction as defined in claim 1 wherein the flexible covering includes a felt layer next the element and an outer layer of plush-like material.

FRIDE EDVIN DAHLSTRÖM.